United States Patent
Eguchi et al.

(10) Patent No.: US 9,379,511 B2
(45) Date of Patent: Jun. 28, 2016

(54) LASER OSCILLATOR AND LASER MACHINING APPARATUS

(75) Inventors: Satoshi Eguchi, Osaka (JP); Hidefumi Omatsu, Osaka (JP); Hiroyuki Hayashikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 672 days.

(21) Appl. No.: 13/203,778

(22) PCT Filed: Mar. 8, 2010

(86) PCT No.: PCT/JP2010/001584
§ 371 (c)(1),
(2), (4) Date: Aug. 29, 2011

(87) PCT Pub. No.: WO2010/103777
PCT Pub. Date: Sep. 16, 2010

(65) Prior Publication Data
US 2012/0006798 A1    Jan. 12, 2012

(30) Foreign Application Priority Data
Mar. 12, 2009 (JP) .................. 2009-059105

(51) Int. Cl.
*B23K 26/14* (2014.01)
*H01S 3/036* (2006.01)
*H01S 3/104* (2006.01)
(Continued)

(52) U.S. Cl.
CPC ............... *H01S 3/036* (2013.01); *H01S 3/104* (2013.01); *H01S 3/0014* (2013.01); *H01S 3/041* (2013.01)

(58) Field of Classification Search
USPC .............. 219/121.6, 121.67; 372/55, 58
See application file for complete search history.

(56) References Cited

U.S. PATENT DOCUMENTS

| 4,764,086 A | 8/1988 | Jesinger |
| 4,984,245 A * | 1/1991 | Karube ................ 372/59 |

(Continued)

FOREIGN PATENT DOCUMENTS

| EP | 1467452 | 10/2004 |
| JP | 63227086 A * | 9/1988 |

(Continued)

OTHER PUBLICATIONS

International Search Report for PCT/JP2010/001584, Mar. 30, 2010.
(Continued)

*Primary Examiner* — Dana Ross
*Assistant Examiner* — Ayub Maye
(74) *Attorney, Agent, or Firm* — RatnerPrestia (57) ABSTRACT

A laser oscillator includes a blower for blowing laser gas to discharge tubes; a gas circulation path for connecting discharge tubes and a blower; a gear chamber pressure detector for detecting the pressure of the gear chamber disposed in the blower; and an alarm part for issuing an alarm when the pressure detected in the gear chamber pressure detector is higher than a predetermined pressure. The predetermined pressure is set based on the average value of the pressure on the laser gas inlet side and the pressure on the laser gas outlet side of the blower. This configuration can prevent the entry of the oil mist generated from the blower into the gas circulation path and an increase in the gas consumption, while maintaining stable laser output for an extended period of time without increasing the running cost.

8 Claims, 4 Drawing Sheets

(51) Int. Cl.
*H01S 3/041* (2006.01)
*H01S 3/00* (2006.01)

(56) References Cited

U.S. PATENT DOCUMENTS

| | | | | |
|---|---|---|---|---|
| 5,004,889 | A | * | 4/1991 | Yamazaki et al. ........ 219/121.61 |
| 5,005,180 | A | * | 4/1991 | Edelman et al. ................ 372/57 |
| 2007/0052543 | A1 | * | 3/2007 | Albarado ...................... 340/679 |
| 2008/0043799 | A1 | * | 2/2008 | Egawa et al. ................... 372/59 |
| 2008/0144681 | A1 | * | 6/2008 | Egawa et al. .............. 372/38.04 |
| 2008/0246930 | A1 | * | 10/2008 | Kido et al. ...................... 355/30 |

FOREIGN PATENT DOCUMENTS

| | | | |
|---|---|---|---|
| JP | 2-246389 A | 10/1990 | |
| JP | 2000-22243 A | 1/2000 | |
| JP | 2000-022243 A | 1/2000 | |
| JP | 2003-110170 A | 4/2003 | |
| JP | 2003110170 A | * 4/2003 | ............. H01S 3/036 |

OTHER PUBLICATIONS

The Extended European Search Report dated Nov. 20, 2014 for the related European Patent Application No. 10750535.6.

* cited by examiner

LASER OSCILLATOR AND LASER MACHINING APPARATUS

This application is a U.S. National Phase Application of PCT International Application PCT/JP2010/001584.

TECHNICAL FIELD

The present invention relates to a laser oscillator and a laser machining apparatus in which the blower blows laser gas to discharge tubes.

BACKGROUND ART

A conventional gas laser oscillator is known in Patent Literature 1, for example. In the gas laser oscillator disclosed in Patent Literature 1, a high voltage is applied between two electrodes disposed in a discharge tube, and thereby a discharge space is generated in the discharge tube. Laser gas is excited by the discharge space and output to the outside as a laser beam through the total reflection mirror and the partial reflection mirror that are disposed at the respective ends of the discharge tube. A gas circulation path that forms the circulation path of the laser gas is connected to the discharge tube, and a blower is disposed inside the gas circulation path. This blower allows the laser gas to circulate in the discharge tube and the gas circulation path.

In the gas circulation path, the blower includes a rotor chamber that incorporates a rotor for blowing gas. The blower also includes a gear chamber that incorporates gears for determining the rotation timing of the rotor. The blower also includes a driver for driving the gears. The rotor and the driver are connected to each other by a shaft. The rotor chamber is connected to the gas circulation path and the rotor allows the laser gas to flow. The pressure of the laser gas is monitored by a gas pressure detector such that the pressure inside the gas circulation path is kept constant.

On the other hand, in the driver of the blower, the rotation of a motor, for example, transmits the motive power to the rotor in the rotor chamber. Lubricating oil is housed in the gear chamber so as to lubricate the bearings and the gears. In order to suppress the entry of the oil mist generated from the lubricating oil into the laser gas circulation path, a seal part is disposed between the rotor chamber and the gear chamber and separates the rotor chamber and the gear chamber. However, a small gap is present between the seal part and the shaft for connecting the rotor and the driver. In order to prevent the entry of the oil mist from the gear chamber to the rotor chamber through this gap caused by vacuum diffusion, the pressure of the gear chamber is set lower than that of the rotor chamber. In this manner, the structure of the technique disclosed in Patent Literature 1 prevents the entry of the oil mist into the gas circulation path when the pressure in the gear chamber varies in acceleration and deceleration of the operation of the blower.

However, when the gap between the seal part and the shaft is increased by abrasion or age deterioration, even in steady operation, the pressure difference between the rotor chamber and the gear chamber is decreased and the pressure difference for preventing the entry of the oil mist cannot be obtained in some cases.

Thus, the continuous operation in this state can cause the entry of the oil mist generated in the gear chamber into the gas circulation path, and thereby decreases the output of the laser beams.

As a measure against the decrease in the pressure difference between the rotor chamber and the gear chamber, an alarm part issues an alarm when the gear chamber pressure detector connected to the gear chamber detects that the pressure of the gear chamber is equal to or higher than a predetermined pressure.

However, when the predetermined pressure is excessively high, a decrease in the pressure difference between the rotor chamber and the gear chamber cannot be detected properly and the output decreases. Conversely, when the predetermined pressure is excessively low, the alarm is frequently issued within a short period of time, which shortens the maintenance interval and increases the running cost.

CITATION LIST

Patent Literature

[PTL1] Japanese Patent Unexamined Publication No. 2000-22243

SUMMARY OF THE INVENTION

The present invention is directed to detect an increase in the gap of seal part 10c in blower 10 and to provide a laser oscillator and a laser machining apparatus with a stable laser output.

The present invention includes the following elements:
a discharge tube for discharging laser gas inside thereof;
a blower for blowing the laser gas to the discharge tube;
a gas circulation path for connecting the discharge tube and the blower;
a gear chamber pressure detector for detecting the pressure of a gear chamber disposed in the blower; and
an alarm part for issuing an alarm when the pressure detected in the gear chamber pressure detector is equal to or higher than a predetermined pressure. The predetermined pressure is set based on the average value of the pressure on the laser gas inlet side and the pressure on the laser gas outlet side of the blower.

This configuration allows an increase in a gap of the seal part to be detected at an appropriate timing when the gap of the seal part between the rotor chamber and the gear chamber in the blower increases. Thus, a laser oscillator and a laser machining apparatus with a stable laser output without an increase in the running cost can be provided.

DETAILED DESCRIPTION OF PREFERRED EMBODIMENTS

Hereinafter, a description is provided for the exemplary embodiments of the present invention, with reference to FIG. 1 through FIG. 4.

First Exemplary Embodiment

Figure 1:
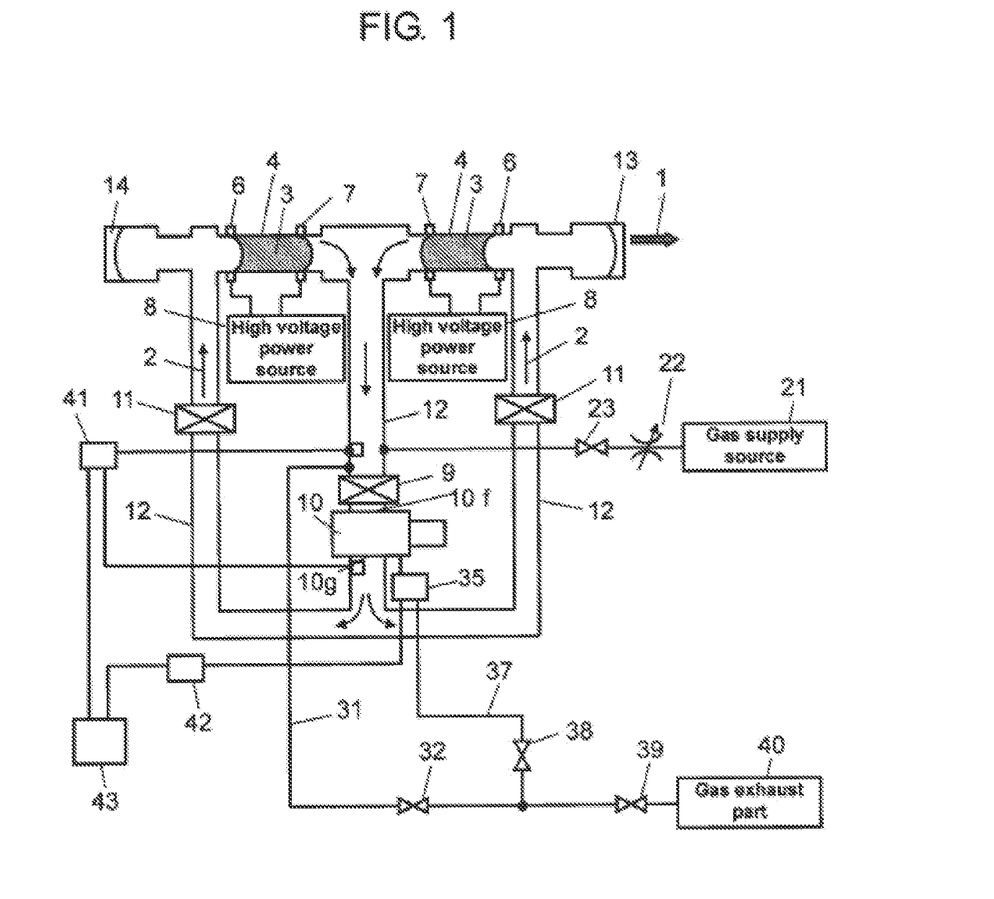
FIG. 1 is a block diagram of a laser oscillator in accordance with the first exemplary embodiment of the present invention.

FIG. 1 is a block diagram of a laser oscillator in accordance with the first exemplary embodiment of the present invention. With reference to FIG. 1, the laser oscillator of this exemplary embodiment includes anode electrode 6 and cathode electrode 7 at the respective ends of each discharge tube 4. Anode electrode 6 and cathode electrode 7 form a discharge part connected to high voltage power source 8 for exciting laser gas 2. Further, these electrodes discharge laser gas 2 inside discharge tube 4 and form discharge space 3. Gas circulation path 12 is connected to discharge tubes 4. Heat exchanger 9, blower 10, and heat exchanger 11 are disposed in gas circulation path 12. Laser gas 2 circulates in gas circulation path 12 of laser gas 2 between discharge tube 4 and blower 10. In this exemplary embodiment, laser gas 2 flows from anode electrodes 6 to cathode electrodes 7. In this exemplary embodiment, two discharge tubes 4 are connected so as to be opposed to each other. However, the discharge tubes may be optically connected in parallel with each other such that the light is returned by a reflecting mirror. The number of discharge tubes 4 does not need to be two as shown in this exemplary embodiment, and may be one or at least three may be connected.

At the respective ends of discharge tubes 4 opposite the connected sides, partial reflecting mirror 13 and total reflecting mirror 14 are disposed so as to form a laser resonator. Partial reflecting mirror 13 of the laser resonator outputs high-power laser beam 1.

Gas circulation path 12 is connected to gas supply source 21 via gas supply adjuster 22 and gas supply solenoid valve 23. Gas circulation path 12 is also connected to first gas exhaust path 31. First gas exhaust path 31 is connected to gas exhaust part 40 via first gas exhaust solenoid valve 32 and gas exhaust stop solenoid valve 39. Gas supply source 21 and gas exhaust part 40 supply laser gas 2 and adjust the pressure thereof.

Figure 2:
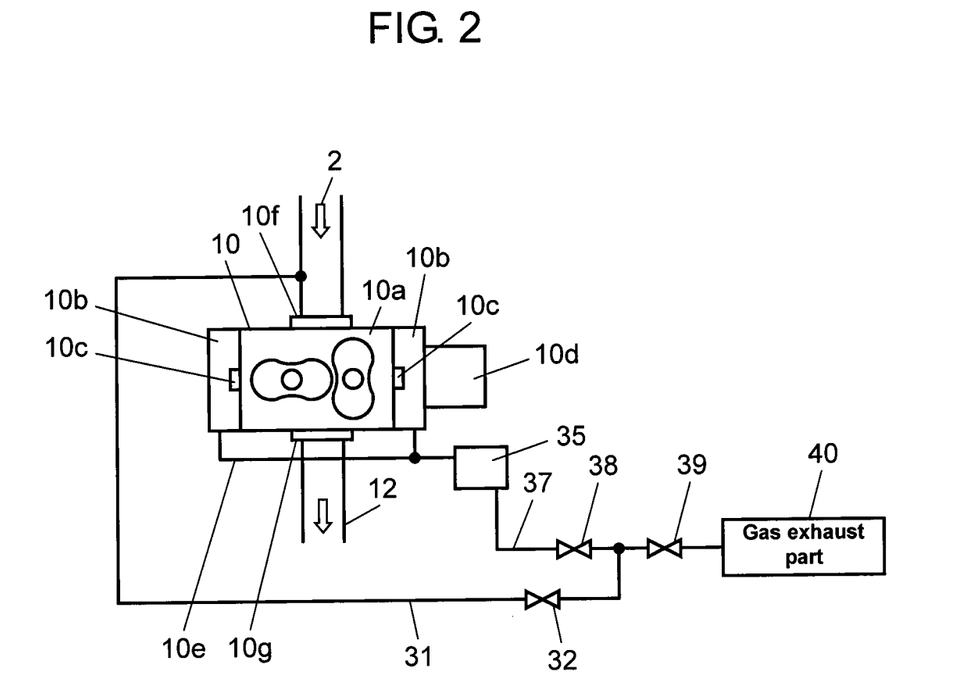
FIG. 2 is a structural diagram of a blower of the laser oscillator in accordance with the first exemplary embodiment.

FIG. 2 is a structural diagram showing blower 10. With reference to FIG. 2, blower 10 includes the following elements: rotor chamber 10a that is in gas circulation path 12 and incorporates rotors for blowing gas: gear chamber 10b that incorporates gears for determining the rotation timing of the rotors; and driver 10d for driving the gears. The rotors and driver 10d are connected to each other by a shaft. Rotor chamber 10a is connected to gas circulation path 12 and the rotors allow laser gas 2 to flow.

Gear chamber 10b of blower 10 is connected to second gas exhaust path 37 via oil mist trap 35. Second gas exhaust path 37 is connected to gas exhaust part 40 via second gas exhaust solenoid valve 38 and gas exhaust stop solenoid valve 39.

As shown in FIG. 1, gas pressure detector 41 for detecting the pressure of inside laser gas 2 is disposed in gas circulation path 12. Gear chamber pressure detector 42 is provided for gear chamber 10b of blower 10 via oil mist trap 35. The output signal from gas pressure detector 41 and gear chamber pressure detector 42 are input to alarm part 43. The respective solenoid valves and parts are controlled by a controller that also serves as alarm part 43.

A description is provided for the operation of the laser oscillator of this exemplary embodiment configured as above. Laser gas 2 circulates in discharge tubes 4 made of dielectric. High voltage power sources 8 that are connected to anode electrodes 6 and cathode electrodes 7 on the periphery of discharge tubes 4 cause a discharge in discharge tubes 4. Laser gas 2 is excited by the discharge and output to the outside through total reflecting mirror 14 and partial reflecting mirror 13 as laser beam 1. Inside gas circulation path 12 that forms the circulation path of laser gas 2 together with discharge tubes 4, laser gas 2 is delivered by blower 10. In order to lower the temperature of laser gas 2 increased by the discharge and blower 10, heat exchangers 9 and 11 are disposed.

In a non-operating state, the insides of gas circulation path 12, blower 10, and discharge tubes 4 are kept at approximately 90 kPa, i.e. the approximately atmospheric pressure. At the start of the operation, first gas exhaust solenoid valve 32, second gas exhaust solenoid valve 38, and gas exhaust stop solenoid valve 39 are opened and the air is evacuated by a vacuum pump, for example, in gas exhaust part 40, so that the pressure is reduced to approximately 1 kPa. At the time when this pressure is at approximately 1 kPa, the operation of blower 10 is started. At the same time, second gas exhaust solenoid valve 38 and gas exhaust stop solenoid valve 39 are closed and thereafter gas supply solenoid valve 23 is opened. Thereby, fresh laser gas 2 is supplied from gas supply source 21 until the operation gas pressure is reached.

When the operation gas pressure is reached, gas exhaust stop solenoid valve 39 is opened so as to exhaust laser gas 2. At the same time, opening/closing of gas supply solenoid valve 23 is controlled such that a constant pressure is obtained in gas pressure detector 41.

Laser gas 2 is degraded because the molecules of the composition gases are separated by the discharge in discharge spaces 3. Thus, a part of the laser gas is exhausted to the outside by gas exhaust part 40. The pressure of laser gas 2 is monitored by gas pressure detector 41. Gas pressure detector 41 makes control by detecting a decrease in the pressure caused by the exhaust of laser gas 2 to the outside and by sending a signal to gas supply source 21, where the gas supply amount is electrically controlled. Thus, non-degraded laser gas 2 equal in amount to exhausted laser gas 2 is supplied such that the pressure inside gas circulation path 12 is kept constant.

On the other hand, in blower 10, driver 10d transmits the motive power to the rotors in rotor chamber 10a through the rotation of the driver, such as a motor. Two rotors are disposed in rotor chamber 10a. The gears in gear chamber 10b determine the rotation timing of the two rotors. Lubricating oil is housed in gear chamber 10b so as to lubricate the bearings and the gears. If the oil mist generated by this lubricating oil enters laser gas 2 circulated by the rotors, the purity of laser gas 2 degrades, which causes considerable malfunction to laser oscillation. Then, in order to suppress the entry of the oil mist into the laser gas circulation path, seal part 10c, e.g. an oil seal or a dry seal, is disposed for the separation of rotor chamber 10a and gear chamber 10b. A gap of several micrometers to several tens of micrometers is provided between seal part 10c and the rotating shaft of the motor such that the rotation of the shaft is not inhibited.

As described above, since a small gap of several micrometers to several tens of micrometers is provided between seal part 10c and the rotating shaft, the oil mist is passed through the gap by vacuum diffusion and enters from gear chamber 10b into rotor chamber 10a. In order to prevent this entry, the gas is exhausted from gear chamber 10b via gear chamber gas exhaust path 10e and oil mist trap 35, e.g. oil mist trap, by gas exhaust part 40 such that the pressure of gear chamber 10b is lower than that of rotor chamber 10a.

When the rotors in rotor chamber 10a are accelerated and decelerated, the pressures of rotor chamber 10a and gear chamber 10b are temporarily unbalanced. Thus, the lubricating oil mist in gear chamber 10b enters gas circulating path 12 through seal part 10c, which adversely affects laser oscillation.

In order to address this problem, the pressure of gear chamber 10b in blower 10 is reduced by gas exhaust part 40, such as a vacuum pump, via a solenoid valve controlled by a signal from the inverter that controls the rotation of the motor and a solenoid valve opened in operation of blower 10. Then, in acceleration and deceleration of blower 10, by the opening/closing control of the solenoid valves with the signal from the inverter, the gas exhaust flow rate from gear chamber 10b is controlled such that the pressure of gear chamber 10b is lower than the pressure of rotor chamber 10a.

However, when the gap between seal part 10c and the rotating shaft of the motor is increased by abrasion or age deterioration, the pressure difference between rotor chamber 10a and gear chamber 10b is decreased even in steady operation, and a pressure difference for preventing the entry of oil mist cannot be obtained in some cases.

Gear chamber pressure detector 42 connected to gear chamber 10b via oil mist trap 35 monitors a decrease in the pressure difference between rotor chamber 10a and gear chamber 10b in the above steady state, and alarm part 43 issues an alarm when a predetermined pressure is reached.

Figure 3A:
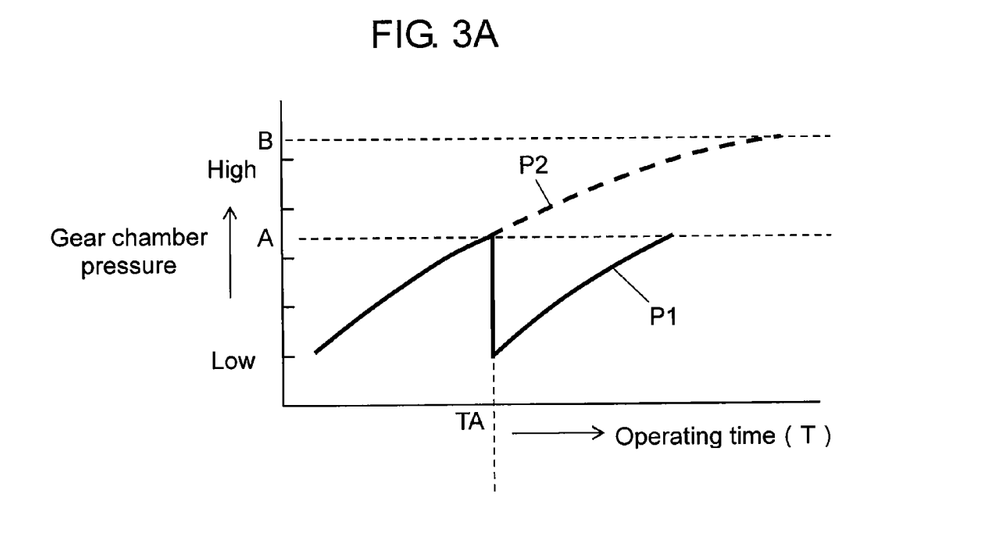
FIG. 3A is a diagram showing a change with time in pressure in a gear chamber in operation in accordance with the first exemplary embodiment.
Figure 3B:
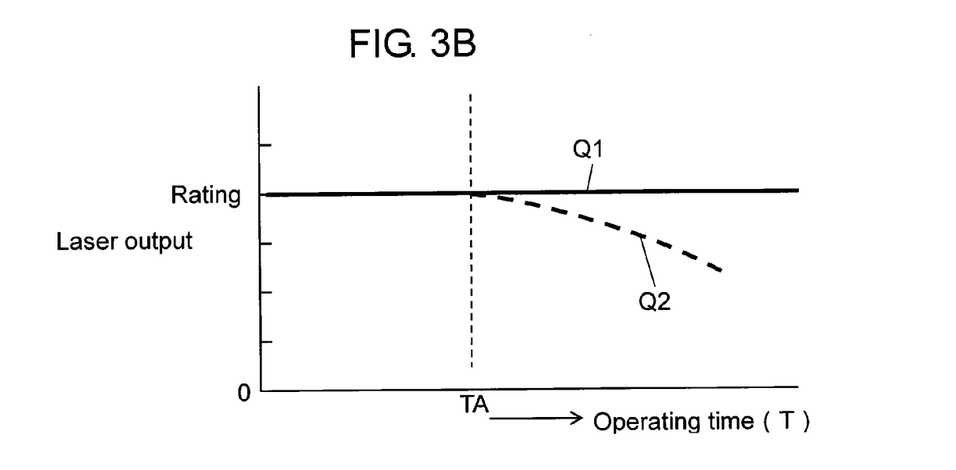
FIG. 3B is a diagram showing a change with time in laser output in operation in accordance with the first exemplary embodiment.

FIG. 3A is a diagram showing a change with time in pressure in a gear chamber of blower 10 when the laser oscillator is in operation in accordance with this exemplary embodiment. FIG. 3B is a diagram showing the relation of a change with time in laser output in the laser oscillator in accordance with this exemplary embodiment. In the case of a new product, since the gap of seal part 10c between rotor chamber 10a and gear chamber 10b is small, the pressure of gear chamber 10b of blower 10 is low. With a lapse of operating time, as shown by solid line P1, the gap is gradually increased by the abrasion or age deterioration of seal part 10c, and the pressure of gear chamber 10b increases with a gently rising curve. At operating time TA, gear chamber pressure detector 42 detects that the pressure of gear chamber 10b has reached point A, which is an average value of the pressure on laser gas inlet side 10f and the pressure on laser gas outlet side 10g of blower 10 set as a predetermined reference value, and alarm part 43 issues an alarm.

Originally, issuing an alarm when the pressure on the gear chamber side of the seal part is higher than that on the rotor chamber side can efficiently prevent the entry of oil mist. However, because the space between seal part 10c and the rotors is very small, it is difficult to accurately measure the pressure of seal part 10c on the side of rotor chamber 10a by installing a port, for example. In this exemplary embodiment, the pressure of seal part 10c on the side of rotor chamber 10a is substantially equal to the average value of the pressure on laser gas inlet side 10f and the pressure on laser gas outlet side 10g of the blower. Thus, with the use of this pressure, the pressure of seal part 10c on the side of rotor chamber 10a can be measured indirectly.

B point of the pressure of gear chamber 10b in FIG. 3A shows the case where the predetermined pressure reference value is set higher than the average value of the pressure on laser gas inlet side 10f and the pressure on laser gas outlet side 10g of blower 10.

In the case of this exemplary embodiment, issuing an alarm at A point in FIG. 3A can inform the user that the gap in the seal part in blower 10 is increased, and the continuous operation in this state causes the entry of oil mist into laser gas 2 and starts to decrease the laser output. Thus, in order to prevent a decrease in the laser output, the user can take a preventive measure of exchanging blower 10 for a new one, for example. Therefore, as shown by solid line Q1 in FIG. 3B, after operating time TA, a decrease in the laser output can be prevented and the rated output can be maintained for an extended period of time.

In the case where the predetermined pressure is set at B point in FIG. 3A, even when the pressure of gear chamber 10b exceeds A point at operating time TA as shown by dotted line P2 and the oil mist starts to enter laser gas 2, the operation is continued. Thus, as shown by dotted line Q2, the laser output decreases.

It has been described that the pressure on the side of gear chamber 10b is made lower than that of rotor chamber 10a such that the entry of the oil mist in gear chamber 10b into rotor chamber 10a is prevented. In this exemplary embodiment, the pressure inside rotor chamber 10a in the vicinity of seal part 10c is approximately the average value of the inlet pressure and the outlet pressure of blower 10. Thus, when the pressure of gear chamber 10b is equal to or higher than the average value of the inlet pressure and the outlet pressure of blower 10, oil mist starts to enter from gear chamber 10b into rotor chamber 10a. For this reason, in this exemplary embodiment, the predetermined pressure, i.e. a reference value at which alarm part 43 issues an alarm, is set to the average value of the inlet pressure and the outlet pressure of blower 10.

If the predetermined pressure is set low, the entry of the oil mist in gear chamber 10b into rotor chamber 10a can be prevented. However, the alarm is frequently issued within a short period of time, which increases the running cost of exchanging blower 10. For this reason, setting the predetermined pressure to the average value of the pressure on laser gas inlet side 10f and the pressure on laser gas outlet side 10g can prevent an increase in the unnecessary running cost and a decrease in the laser output.

If the pressure of gear chamber 10b becomes equal to or higher than the average value of the inlet pressure and the outlet pressure of blower 10, the oil mist in gear chamber 10b instantaneously starts to enter rotor chamber 10a.

In order to address this problem, when the pressure of gear chamber 10b is higher than the average value of the inlet pressure and the outlet pressure of blower 10 for at least one second, an alarm is issued. This can prevent the entry of the oil mist more effectively.

The predetermined pressure can be set to a numerical value obtained by subtracting a half of a variation in the pressure pulsation of laser gas 2 from the average value of the pressure on laser gas inlet side 10f and the pressure on laser gas outlet side 10g of blower 10.

As described above, the pressure in the vicinity of seal part 10c inside rotor chamber 10a is approximately the average value of the inlet pressure and the outlet pressure of blower 10. Actually, the pressure of laser gas 2 is not constant and has pulsations. Thus, when the pulsation is at the minimum, the pressure in the vicinity of seal part 10c can instantaneously becomes lower than that of gear chamber 10b in some cases. In order to address this problem, the predetermined pressure is set to a numerical value obtained by subtracting a half of a variation in the pressure pulsation of laser gas 2 from the average value of the pressure on laser gas inlet side 10f and the pressure on laser gas outlet side 10g of blower 10. This can prevent the entry of the oil mist more effectively.

However, if the predetermined pressure is set excessively low, the entry of the oil mist in gear chamber 10b into rotor chamber 10a can be prevented, but the alarm is issued frequently within a short period of time. This increases the running cost of exchanging blower 10. Typically, the pressure pulsations of laser gas 2 are at several hundred hertz or higher. Thus, the period during which the pressure of gear chamber 10b is equal to or higher than the numerical value obtained by subtracting a half of a variation in the pressure pulsation of laser gas 2 from the average value of the pressure on laser gas inlet side 10f and the pressure on laser gas outlet side 10g is extremely short, e.g. for several milliseconds. Therefore, no oil mist enters.

Thus, when the pressure of gear chamber 10b is equal to or higher than the numerical value obtained by subtracting a half of a variation in the pressure pulsation of laser gas 2 from the average value of the pressure on laser gas inlet side 10f and the pressure on laser gas outlet side 10g for at least ten minutes, an alarm is issued. This can suppress a useless increase in the running cost.

Second Exemplary Embodiment

Figure 4:
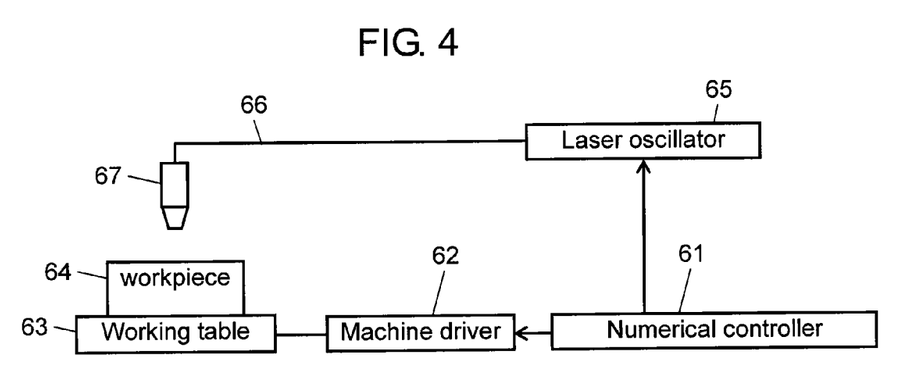
FIG. 4 is a structural diagram of a laser machining apparatus in accordance with a second exemplary embodiment.

FIG. 4 is a structural diagram of a laser machining apparatus in accordance with the second exemplary embodiment of the present invention. With reference to FIG. 4, the laser machining apparatus of this exemplary embodiment includes working table 63 for receiving workpiece 64 thereon. The laser machining apparatus of this exemplary embodiment also includes machine driver 62 for moving at least one of working table 63 and focuser 67 for focusing laser beams. The laser machining apparatus of this exemplary embodiment also includes numerical controller 61 for controlling machine driver 62, laser oscillator 65 of the first exemplary embodiment, and laser light path 66.

Laser beams emitted from laser oscillator 65 are transmitted through laser light path 66 formed of returning mirrors, for example, and focused by focuser 67. The focused laser beam is radiated to workpiece 64, and the work is started. At the same time, an instruction is output from numerical controller 61 to machine driver 62. Thereby, workpiece 64 is worked by operating at least one of working table 63 and focuser 67.

The laser machining apparatus of this exemplary embodiment includes the laser oscillator of the first exemplary embodiment. This eliminates the variations in the output of the laser beam caused by oil mist, and allows irradiation of laser beams at accurate output power. Further, the numerical controller allows unified control of laser oscillator 65, which improves the reliability of laser machining and prevents defective parts from being mixed into workpieces.

As described above, the present invention includes the following elements:
a discharge tube for discharging laser gas inside thereof;
a blower for blowing the laser gas to the discharge tube;
a gas circulation path for connecting the discharge tube and the blower;
a gear chamber pressure detector for detecting the pressure of a gear chamber disposed in the blower; and
an alarm part for issuing an alarm when the pressure detected in the gear chamber pressure detector is equal to or higher than a predetermined pressure.
The predetermined pressure is set based on the average value of the pressure on the laser gas inlet side and the pressure on the laser gas outlet side of the blower.

With this configuration, even when a gap of the seal part between the rotor chamber and the gear chamber and thus the pressure of the gear chamber increase, the increase in the pressure can be detected by the gear chamber pressure detector at an appropriate timing and an alarm can be issued. This can prevent the entry of oil mist into the laser gas circulation path. Further, this configuration can prevent an increase in the maintenance cost caused by the following phenomenon: even though a pressure difference necessary for preventing the entry of oil mist is sufficiently kept between the gear chamber and the rotor chamber, an increase in the pressure of the gear chamber is detected earlier than required and an alarm is issued.

Therefore, the present invention can detect an increase in the gap of the seal part at an appropriate timing when the gap of the seal part between the rotor chamber and the gear chamber in the blower increases, and provide a laser oscillator and a laser machining apparatus with a stable laser output, without increasing the running cost.

INDUSTRIAL APPLICABILITY

The present invention can reduce the influence of the oil mist from a blower and enhance the stability of the laser output and the long-term reliability without increasing the running cost, and thus is useful as various types of laser oscillator and laser machining apparatus.

REFERENCE MARKS IN THE DRAWINGS

1 Laser beam
2 Laser gas
3 Discharge space
4 Discharge tube
6 Anode electrode
7 Cathode electrode
8 High voltage power source
9, 11 Heat exchanger
10 Blower
10a Rotor chamber
10b Gear chamber
10c Seal part
10d Driver
10e Gear chamber gas exhaust path
10f Laser gas inlet side
10g Laser gas outlet side
12 Gas circulation path
13 Partial reflecting mirror
14 Total reflecting mirror
21 Gas supply source
22 Gas supply adjuster
23 Gas supply solenoid valve
31 First gas exhaust path
32 First gas exhaust solenoid valve
33 Oil mist trap
37 Second gas exhaust path
38 Second gas exhaust solenoid valve
39 Gas exhaust stop solenoid valve
40 Gas exhaust part
41 Gas pressure detector
42 Gear chamber pressure detector
43 Alarm part
61 Numerical controller
62 Machine driver
63 Working table
64 Workpiece
65 Laser oscillator
66 Laser light path
67 Focuser

The invention claimed is:
1. A laser oscillator comprising:
a discharge tube for exciting gas with a discharge and outputting a laser beam;
a blower for blowing the gas to the discharge tube, the blower including a gas inlet side at which the gas enters the blower, a gas outlet side at which the gas exits the blower, and a gear chamber containing one or more gears;

a gas circulation path for connecting the discharge tube and the blower;

a gas supply source for supplying the gas to the gas circulation path;

a gear chamber pressure detector for detecting a pressure in the gear chamber, the pressure in the gear chamber different from a pressure in a rotor chamber of the blower; and an alarm part for issuing an alarm when the pressure in the gear chamber is equal to or higher than a predetermined pressure, wherein the predetermined pressure is set based on an average value of a pressure on the gas inlet side and a pressure on the gas outlet side of the blower;

an inlet side pressure detector for detecting pressure of the gas on the gas inlet side of the blower; and an outlet side pressure detector for detecting pressure of the gas on the gas outlet side of the blower.

2. The laser oscillator of claim 1, wherein when the pressure detected in the gear chamber pressure detector exceeds the average value of the pressure on the laser gas inlet side and the pressure on the laser gas outlet side of the blower for at least one second, the alarm part issues the alarm.

3. The laser oscillator of claim 1, wherein a numerical value obtained by subtracting a half of a variation in a pressure pulsation of the laser gas from the average value of the pressure on the laser gas inlet side and the pressure on the laser gas outlet side of the blower is used as the predetermined pressure.

4. The laser oscillator of claim 1, further comprising:

an inlet side pressure detector for detecting the pressure on the laser gas inlet side of the blower; and an outlet side pressure detector for detecting the pressure on the laser gas outlet side of the blower.

5. The laser oscillator of claim 3, wherein when the pressure detected in the gear chamber pressure detector exceeds a numerical value obtained by subtracting a half of a variation in the pressure pulsation of the laser gas from the average value of the pressure on the laser gas inlet side and the pressure on the laser gas outlet side of the blower for at least ten minutes, the alarm part issues the alarm.

6. The laser oscillator of claim 2, further comprising:

an inlet side pressure detector for detecting the pressure on the laser gas inlet side of the blower; and an outlet side pressure detector for detecting the pressure on the laser gas outlet side of the blower.

7. The laser oscillator of claim 3, further comprising:

an inlet side pressure detector for detecting the pressure on the laser gas inlet side of the blower; and an outlet side pressure detector for detecting the pressure on the laser gas outlet side of the blower.

8. The laser oscillator of claim 5, further comprising:

an inlet side pressure detector for detecting the pressure on the laser gas inlet side of the blower; and an outlet side pressure detector for detecting the pressure on the laser gas outlet side of the blower.

* * * * *